May 27, 1969

R. J. MASON 3,447,055

D.C. MOTOR SPEED CONTROL CIRCUIT

Filed Oct. 17, 1966

RAYMOND J. MASON
INVENTOR.

BY Beehler & Arant

ATTORNEYS

United States Patent Office 3,447,055
Patented May 27, 1969

3,447,055
D.C. MOTOR SPEED CONTROL CIRCUIT
Raymond J. Mason, Lynwood, Calif., assignor to Minarik Electric Company, Los Angeles, Calif., a corporation of California
Filed Oct. 17, 1966, Ser. No. 587,063
Int. Cl. H02p *5/12, 5/36, 7/24*
U.S. Cl. 318—331      6 Claims

ABSTRACT OF THE DISCLOSURE

A speed control circuit for a D.C. motor, which includes a rectifier that is hooked to an alternating current supply for providing rectified but essentially unfiltered voltage, a speed control potentiometer for subjecting the motor armature to a selected portion of the available supply voltage in order to thereby establish a nominal operating speed, two feedback circuits for sensing the rectified supply voltage and the armature current, respectively, and feeding them back in a phase relationship, two capacitors for storing the respective feedback signals so as to provide respective control signals which are a function of several cycles of motor operation, and a transistor responsive to the signal stored on both capacitors for controlling the action of a unijunction transistor which in turn controls the operation of the rectifier circuit for increasing or decreasing the flow of current.

---

Figure 1:
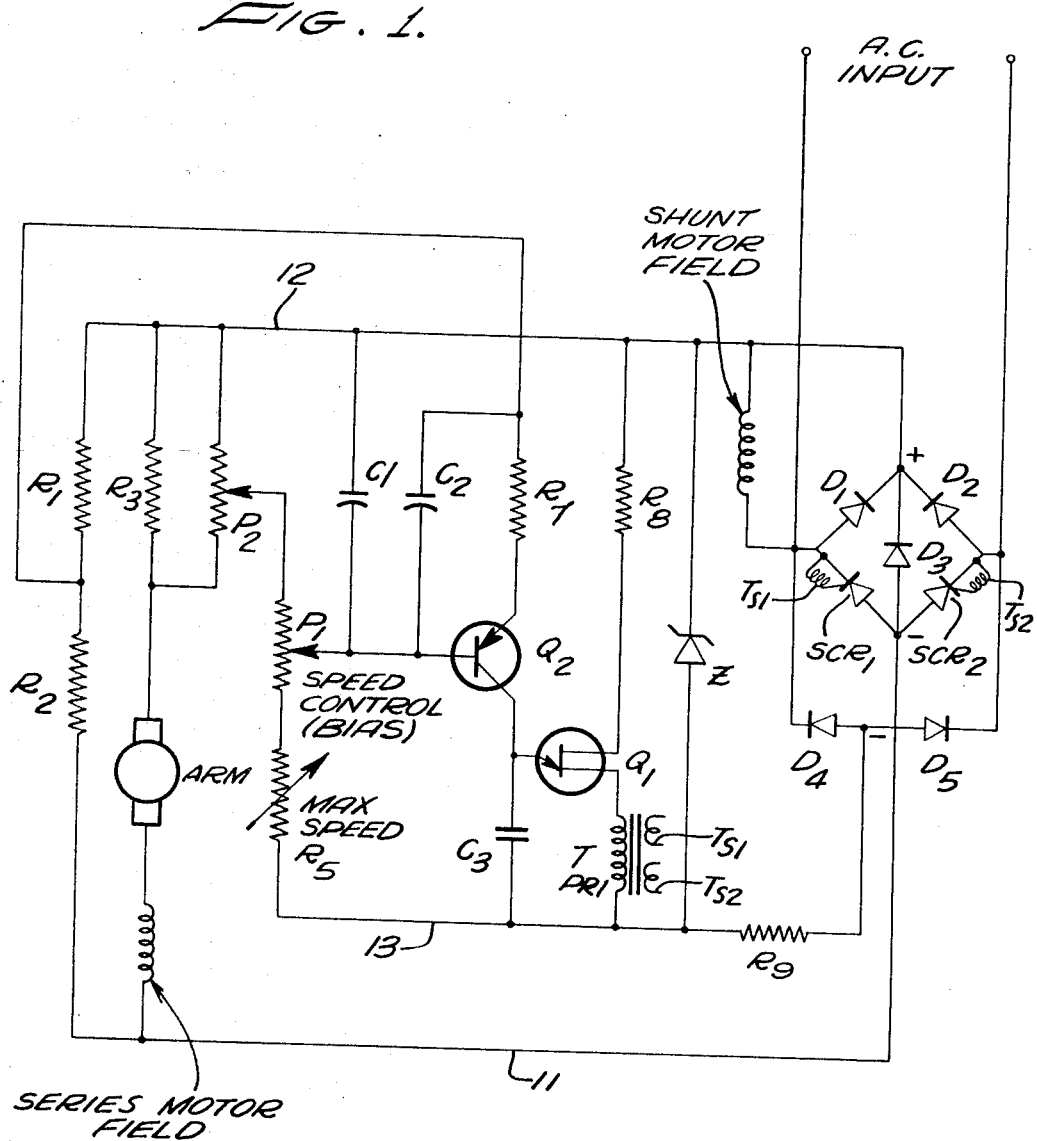

The present invention relates to a control circuit for stabilizing the speed of a D.C. motor at a selected value despite fluctuations both in the supply line voltage and in the mechanical load driven by the motor.

It is now a conventional practice to incorporate both a power supply circuit for converting alternating current into direct current, and a speed control circuit, into a single package. This complete motor controller can simply be plugged into a standard A.C. outlet, connected to the D.C. motor, a speed selection knob set to a desired speed setting, and a switch is then returned on to energize the motor. In many applications it is important to maintain the motor speed constant, despite both fluctuations in line voltage and variations in the motor load. A motor controller for accomplishing this purpose is disclosed in my copending application Ser. No. 3961,627 filed Aug. 24, 1964, and assigned to the same assignee as this application, now Patent No. 3,327,195.

In such a motor controller it is desirable to utilize solid state devices which will withstand considerable mechanical abuse and do not require frequent replacement. Accordingly, the circuit in my prior application includes a full-wave rectifier which utilizes a pair of diodes and a pair of silicon-controlled rectifiers, for supplying current to the motor armature. An additional pair of diodes provide rectification for a control voltage which supplies current through a dropping resistor to a reverse-biased Zener diode, and the voltage across the Zener provides a fixed reference level for control puropses. A transformer having two secondary windings is utilized for switching on the silicon-controlled rectifiers, and a unijunction transistor controls the primary winding of the transformer. A second transistor controls the firing of the unijunction, for initiating the conduction of the SCR's at the proper point in each cycle, and the bias voltage of the second transistor is in turn controlled by a speed setting potentiometer. Two separate control signals are also supplied to the second, or control transistor, for controlling its operation in accordance with existing operating conditions of the motor and motor controller circuit.

The characteristics of the motor controller of my prior application, to the extent briefly described above, are also found in the controller of the present invention. However, the present controller differs in that there is an essential absence of filtering of the supply voltage; the manner of deriving the control signals for the second or control transistor is significantly different; and the present controller also includes a unique current limiting circuit.

Thus the primary object of the invention is to provide an improved motor controller for D.C. motors, which incorporates solid state components.

Figure 2:
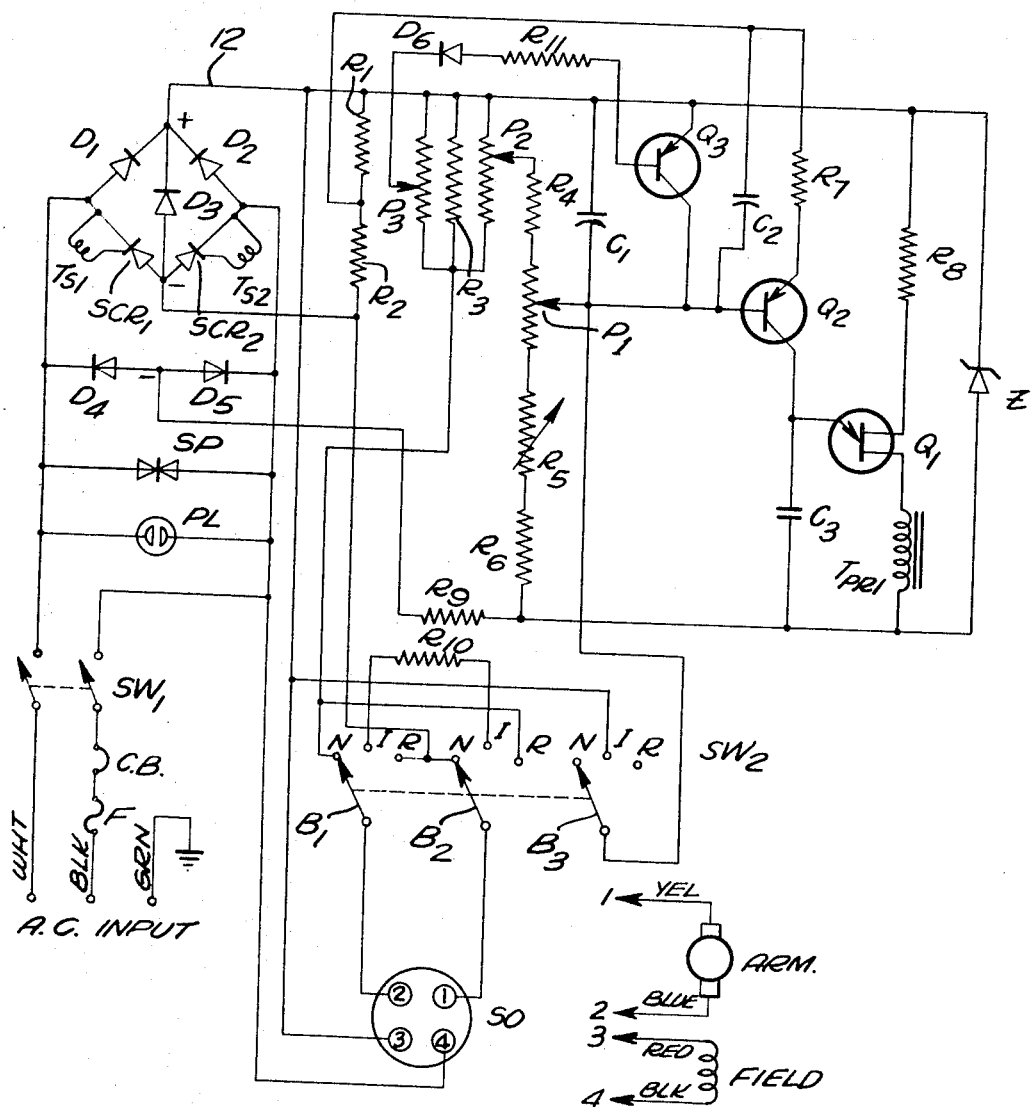

The objects and advantages of the invention will be more fully apparent from the following description considered in conjunction with the accompanying drawings, wherein:

FIGURE 1 is a schematic circuit diagram illustrating certain significant features of my new motor controller; and FIGURE 2 is a schematic circuit diagram illustrating the complete details of my new controller.

Referring now to FIGURE 1 of the drawings, it is seen that diodes D–1 and D–2 together with the silicon-controlled rectifiers SCR 1 and SCR 2 provide a full-wave bridge rectifier whose construction and operation are entirely conventional. This full-wave rectifier is connected to the A.C. supply line, and supplies potential from plus and minus terminals as indicated for energizing the motor armature. Diode D–3 which has its anode connected to the anodes of the SCR's, and its cathode connected to the cathodes of diodes D–1 and D–2, is a conventional free-wheeling diode whose purpose is to prevent an inductive kickback when the SCR's are turned off, and to thereby avoid prolonging the conductivity of the SCR's beyond what is intended.

The circuit of FIGURE 1 includes both a shunt motor field winding, which is coupled in parallel with diode D–1, and a series motor field winding which is coupled in series with the armature. Depending upon the type of operation desired it is possible to use either the series winding alone, the shunt winding alone, or a combination of both windings having an appropriate number of turns in each. In a specific example which is subsequently described, however, only the shunt winding is utilized.

A separate reference voltage is provided by a back-biased Zener diode indicated in the drawing by the symbol Z, for energizing the control circuits. A second full-wave rectifier is provided by a second pair of semiconductor diodes D–4 and D–5 in conjunction with the diodes D–1 and D–2 previously described. The cathode of D–4 is connected to the anode of D–1 and to one side of the A.C. line, the cathode of D–5 is connected to the anode of D–2 and to the other side of the A.C. line, while the anodes of D–4 and D–5 together provide a negative supply terminal. A dropping resistor R–9 connected between this negative terminal and the anode of the Zener diode Z permits the Zener voltage to be held constant despite fluctuations in the A.C. supply line voltage.

A transformer having a primary winding $T_{pr1}$ and secondary windings $T_{s1}$ and $T_{s2}$ is utilized for controlling the conductivity of the SCR's. Thus the secondary winding $T_{s1}$ is connected between the gate and cathode terminals of SCR 1 while secondary winding $T_{s2}$ is connected between the gate and cathode of SCR 2. A unijunction transistor Q–1 has its primary conduction circuit connected in series with the primary winding of the transformer in order to selectively provide energy pulses for controlling the SCR's. A capacitor C–3 is coupled between the emitter of the unijunction transistor and one end of $T_{pr1}$ to provide a series loop circuit and as is well known in this circuit arrangement the voltage stored on the capacitor C–3 must achieve a certain value in order to fire the unijunction and hence pulse the transformer. Positive supply line 12 is connected to the cathodes of diodes D-1 and D-2 for supplying both the armature and the control circuitry, while negative supply lead 11 is connected to the anodes of the SCR's for supplying only the motor armature. It will thus be seen that the conduction of current in the supply lead 11 is controlled by the SCR's and hence by the unijunction transistor Q-1.

During each half cycle only one of the SCR's is forward-biased, and hence able to be rendered conductive. The charging time of capacitor C-3 is such that the unijunction transistor Q-1 is pulsed once each half cycle. This places a positive pulse on the gate of each SCR, that is, the gate is rendered positive with respect to the cathode. The gating pulse has no effect on the back-biased SCR but does initiate conduction of the forward-biased SCR. The timing of the gate pulse determines the proportion of each half cycle in which current flows from the A.C. supply line. During the remaining (beginning) portion of each half cycle there is no current flow from the A.C. line and the available energy is simply not being used.

A resistor R-1 is connected to lead 12, and a resistor R-2 having many times the resistance value of R-1 is connected between R-1 and lead 11. These resistors provide a voltage divider for the armature supply voltage, with the voltage across R-1 being of relatively small magnitude but always substantially proportional to the armature voltage. A feedback signal for use in the control circuit in a manner subsequently explained, is therefore derived across R-1.

A resistor R-3 is connected to the positive supply lead 12 the series field winding (if it is used) is connected to negative supply lead 11, and the motor armature is connected between R-3 and the series winding. Resistor R-3 is of a very small value such as one ohm, and being connected directly in series with the motor armature it carries the full armature current. Another feedback or control signal is therefore derived across resistor R-3, and is used in the control circuitry in the manner subsequently explained.

A second or control transistor Q-2 has its collector connected to the emitter (or control electrode) of the unijunction transistor Q-1, while its emitter is connected through a resistor R-7 to the juncture of R-1 and R-2. The base of transistor Q-2 is connected to the movable tap on a speed control potentiometer $P_1$. A potentiometer $P_2$ has a resistance value significantly larger than that of R-3 and is connected in parallel with R-3 so that the movable tap of potentiometer $P_2$ may be used to take off a selected portion of the total voltage drop across resistor R-3. The movable tap of potentiometer $P_2$ is connected to the upper end of potentiometer $P_1$, while the lower end of $P_1$ is connected through a variable resistor R-5 to the negative supply line 13 for the control circuitry. The remaining elements of the control circuit as illustrated in FIGURE 1 are a capacitor C-1 which is connected between the movable tap of potentiometer $P_1$ and the positive supply lead 12, and a capacitor C-2 which is connected between the same movable tap and the upper end of resistor R-7, i.e., the juncture of R-1 and R-2.

It is significant to note in the circuit of FIGURE 1 that two different kinds of feedback signals are utilized for controlling the action of the control circuitry. That is, the feedback signal derived across R-1, and supplied through R-7 and C-2 to the transistor Q-2 is a voltage signal which is directly proportional to the armature supply voltage, and which is therefore influenced by line voltage fluctuations as well as by the period of conductivity of the SCR's. On the other hand, the feedback signal derived across R-3 (or more specifically, across the selected portion of potentiometer $P_2$) is in proportion to the current flowing through the motor armature, and is therefore primarily a function of the motor load.

The values of R-1 and R-2 are preferably selected so as to maintain the armature supply voltage (that is, the voltage existing between supply leads 11 and 12) substantially constant despite variations both in A.C. line voltage and in the motor load. It is not feasible to overcompensate the voltage because oscillation or hunting would result. Therefore the value of R-1 is selected large enough to maintain the voltage at approximately a constant level. This selection is made by moving the tap of potentiometer $P_2$ to its upper limit position. Maintaining the armature supply voltage at a constant level does not, however maintain the armature speed at a constant value. As the motor load increases the increasing torque produces an increasing armature current, and the internal voltage drop in the armature is proportional to the current. Therefore, even when the armature supply voltage is held constant the increasing voltage drop within the armature resulting from increased motor load causes the net voltage available for driving the armature to diminish, and the motor speed drops.

The value of variable resistor R-5 is set at a sufficiently large amount so that, when the movable tap of $P_1$ is at the lower end of potentiometer $P_1$ the maximum speed which the motor then achieves will be within tolerable limits. Minimum motor speed is achieved when the movable tap of $P_1$ is at the upper end of that potentiometer.

The second corrective or feedback signal, derived from $P_2$, is empirically adjusted after resistors R-1 and R-2 are already included in the circuit. The setting of the movable tap of $P_2$ is determined by loading the motor and observing the speed regulation characteristic.

It is significant that the rectifiers of the circuit of FIGURE 1 are essentially unfiltered, so that the motor armature receives a significant ripple voltage at a 120-cycle frequency in addition to the steady-state voltage. Resulting energy losses in the motor cause the motor to heat up to a measurable extent, but the motor controller operates with negligible energy losses and does not present any problem of overheating.

The inclusion of both of the capacitors C-1 and C-2 has been found essential in the present form of the circuit. Capacitor C-1 stabilizes the feedback voltage obtained from resistor R-3 and also acts as an accelerating capacitor, while capacitor C-2 stabilizes the feedback voltage derived across R-1.

The voltage existing between leads 11 and 12, which is nominally the armature supply voltage, is derived from the A.C. line during the portion of each half-cycle when a corresponding one of the SCR's is conducting, but during the remaining or early portion of each half cycle it is derived from the armature itself. That is, when the supply line is isolated due to nonconduction of the SCR's the armature back E.M.F. supplies votlage which appears across the leads 11, 12. Hence during part of each half-cycle the voltage across resistor R-1 is in fact derived from the supply line, while during the remaining part of each half-cycle the voltage is actually derived from the motor armature. Resistor R-7 drains current from the R-1, R-2 voltage divider and supplies current to the emitter-collector circuit of transistor Q-2. Due to the cyclic variations of the voltage drop across R-1, occurring as a result of both the conductive and nonconductive portion of each half-cycle of the line voltage, as previously explained, the votlage drop across R-7 would also tend to vary in the same manner. However, capacitor C-2 serves to stabilize this variation to a considerable extent. The time constant associated with capacitor C-2 is large enough so that the regulating action achieved by the feedback signal derived across resistor R-1 is a function of several cycles, that is, during any particular half-cycle the resulting charging time constant for capacitor C-3 is a composite function of several preceding voltage cycles. Due to this integrating or time delay action of C-2 the tendency for oscillations or hunting to result from the feedback signal derived across R-1 is reduced.

The feedback signal derived from resistor R-3 is also integrated and delayed in a similar manner by capacitor C–1. The series loop circuit consisting of capacitor C–1, potentiometer P₁, and potentiometer P₂ additionally includes a fixed resistor R–4 (see the circuit of FIGURE 2), and the values are such that the time constant associated with capacitor C–1 is fairly large compared to one cycle of the 60-cycle supply voltage. Therefore, during any half-cycle of the supply voltage the regulating action which C–1 applies to the base of transistor Q–2 is a composite function of the armature current during several preceding cycles.

It appears significant that due to the capacitive nature of the motor armature, the currents through R–1 and R–3 are not exactly in phase with each other. Therefore, the feedback signals on C–1 and C–2 are additive at an angle, and produce less tendency for oscillation than if they were precisely in phase.

Reference is now made to FIGURE 2 of the drawings for additional details of the circuit of the present invention. All of the elements of the circuit of FIGURE 1 are found in FIGURE 2, except for the series field winding which is omitted because the circuit of FIGURE 2 is specifically intended for a shunt wound motor. The various circuit elements already described with reference to FIGURE 1 bear the same reference designations in FIGURE 2, and are connected and operate in the same fashion as previously described.

FIGURE 2 also shows that the A.C supply line carries, in one of its leads, both a fuse and a circuit breaker. Both leads of the supply line are capable of being interrupted by a switch SW–1. On the load side of SW–1 is an indicator or pilot light identified as PL connected across the line, and also a surge suppressor identified as SP which includes a pair of back-to-back selenium rectifiers for clipping transient pulses to a safe level.

A motor reversing switch SW–2 has three blades identified as B–1, B–2, and B–3. SW–2 is a three position switch having a normal or forward position identified as N, intermediate position identified as I, and a reverse position identified as R. In position R the potential supply to the motor armature is reversed relative to that supplied in position N. In the intermediate position I the armature is disconnected from its supply voltage and is instead shorted by a resistor R–10, whose function is to dissipate energy stored in the armature winding before energy of a reverse polarity is applied thereto. Blade B–3 has no function in the normal or reverse positions, but in the intermediate position it connects the movable tap of potentiometer P₁ to lead 12. The resulting change in potential across the accelerating capacitor C–1 causes the potential of the movable tap of P₁ to be temporarily raised so as to decrease the motor speed.

In addition to the switch arrangements already described, which are conventional, the circuit of FIGURE 2 also includes a novel current limiting circuit. For this purpose a third or current limiting transistor Q–3 is utilized, having its emitter connected to lead 12 while its collector is connected to the base of Q–2. A potentiometer P₃ is coupled in parallel with resistor R–3, and the movable tap of P₃ is connected to the cathode of a diode D–6, with a resistor R–11 being connected between the anode of D–6 and the base of Q–3.

The operation of the current limiting circuit is as follows. Diode D–6 is a silicon diode which requires a forward bias of approximately 0.6 volt before it will conduct a substantial current. During normal operation of the motor, within allowable values of armature current, the setting of the movable tap of potentiometer P₃ is such that diode D–6 does not receive this necessary amount of forward bias. However, when the armature current exceeds a predetermined safe value, the potential drop across the upper portion of P₃ is then sufficient to bias diode D–6 up to or beyond the 0.6 volt. Accordingly, substantial current flows through diode D–6 and through the emitter-base conduction path of transistor Q–3. The emitter-collector path of Q–3 then conducts current heavily, raising the potential of the base of transistor Q–2, and progressively cutting off the current conduction in the emitter-collector path of Q–2. Capacitor C–3 therefore charges more slowly, and the SCR's are conductive during a smaller portion of each half cycle, resulting in the supply of a lesser amount of energy to the motor controller circuit. While the cutoff action achieved by Q–3 is rather gradual, and not sharp or sudden, it is sufficient to limit the armature current to a safe value, although the necessary result is that the armature speed will then drop and the armature may even stall.

It will therefore be seen that the feedback or control signal derived across potentiometer P₂ is a positive signal, which increases the supply of energy to the circuit when the mechanical load on the motor increases. On the other hand, the feedback signal derived from potentiometer P₃ and applied to transistor Q–3 is a negative feedback. However, the negative feedback circuit does not come into operation during the portion of the motor load characteristic where speed regulation is desired. If only comes into operation when the armature current is in excess of its safe value, and the consideration of protecting the motor from damage then receives priority over the design objective of maintaining a fixed motor speed.

The preferred circuit values for the circuit of FIGURE 2 are as follows:

| | |
|---|---|
| SCR–1, SCR–2 | C22B (7.4 amperes, 200 volts). |
| D–1, D–2, D–3 | 1N3495 (18 amperes, 400 volts). |
| D–4, D–5 | TS–6 (0.75 ampere, 600 volts). |
| Resistor R–1 | 300 ohms, ½ watt. |
| Resistor R–2 | 5,000 ohms, 5 watts. |
| Resistor R–3 | 1 ohm, 40 watts. |
| Resistor R–4 | 100 ohms, ½ watt. |
| Resistor R–5 | 25,000 ohms, ½ watt. |
| Resistor R–6 | 3,900 ohms, ½ watt. |
| Resistor R–7 | 300 ohms, ½ watt. |
| Resistor R–8 | 470 ohms, ½ watt. |
| Resistor R–9 | 3,300 ohms, 5 watts. |
| Capacitor C–1 | 400 microfarads, 10 volts. |
| Capacitor C–2 | 600 microfarads, 3 volts. |
| Capacitor C–3 | 0.15 microfarad, 75 volts. |
| Diode Z | 20 volts, 1 watt. |
| Transistor Q–1 | 2N2646 UJT. |
| Transistor Q–2, Q–3 | 2N3905 (Motorola). |
| Transformer | Pulse transformer, ratio 1:1:1. |
| Potentiometer P–1 | 1,500 ohms, 5 watts. |
| Potentiometer P–2 | 50 ohms, 1½ watts. |
| Potentiometer P–3 | 50 ohms, 1½ watts. |

The invention has been described in considerable detail in order to comply with the patent laws by providing a full public disclosure of at least one of its forms. However, such detailed description is not intended in any way to limit the broad features or principles of the invention, or the scope of patent monopoly to be granted.

Having described the invention, what is claimed as new in support of Letters Patent is:

1. A D.C. motor speed control circuit comprising, in combination:
   a pair of armature supply voltage leads;
   first and second resistors connected in series between said leads;
   a third resistor connected to one of said leads;
   means for coupling a motor armature between said third resistor and the other of said leads;
   a first feedback circuit coupled to said first resistor for producing a first feedback signal as a function of the voltage appearing across said first resistor, said first feedback circuit including a first capacitor for storing said first feedback signal;
   a second feedback circuit coupled across said third resistor for producing a second feedback signal as a function of the voltage appearing across said third resistor, said second feedback circuit including a second capacitor for storing said second feedback signal;
a control device;
means coupling both of said capacitor to said control device;
a rectifier circuit coupled in series with said supply voltage leads; and
control circuit means coupling said control device to said rectifier circuit for controlling the operation of said rectifier circuit as a composite function of said two feedback signals.

2. A motor controller as claimed in claim 1 which additionally includes a fixed reference voltage lead, and means for producing a fixed reference voltage between said fixed reference voltage lead and one of said armature supply leads; wherein said control device is a transistor; said first feedback circuit couples said first resistor to one end of the emitter-collector current conduction path of said transistor; and said control circuit means couples the other end of the emitter-collector current conduction path of said transistor to said fixed reference voltage supply lead.

3. A feedback circuit for controlling the voltage and current supplied to a load device, comprising, in combination:
means for producing a first feedback voltage signal substantially proportional to the voltage supplied to the load device;
means for producing a second feedback voltage signal proportional to the current drawn by the load device;
a control transistor having a base, a collector, and an emitter;
a reference voltage source having two output terminals;
means for biasing said base relative to said two output terminals;
a first capacitor coupled between said base and one of said output terminals;
means for applying said first feedback voltage signal between said base and said one output terminal;
a resistor having one end connected to said emitter;
a second capacitor connected between said base and the other end of said resistor;
means for applying said first feedback voltage signal between said one output terminal and said other end of said resistor; and
an output circuit coupled between said collector and said other output terminal.

4. A motor speed control circuit comprising, in combination:
means for supplying a rectified but essentially unfiltered voltage to the motor armature;
means for producing a first voltage feedback signal substantially proportional to the voltage applied to motor armature;
means for producing a second voltage feedback signal proportional to the current drawn by the motor armature;
means for producing a first control signal as a function of a plurality of cycles of said first feedback signal;
means for producing a second control signal as a function of a plurality of cycles of said second feedback signal; and
and control means responsive to said first and second control signals for controlling the voltage and current supplied to the motor armature as a composite function of said first and second control signals.

5. A motor speed control circuit as claimed in claim 4 wherein said means for producing said first control signal includes a capacitor, and said means for producing said second control signal includes another capacitor.

6. A motor speed control circuit as claimed in claim 4 wherein said control means includes a transistor having a base, an emitter, and a collector; means for biasing said base relative to said emitter; means for applying said first control signal between said base and emitter; means for applying said second control signal between said base and emitter; and current-controlling means coupled in series with the emitter-collector conduction path of said transistor.

References Cited

UNITED STATES PATENTS

| | | | |
|---|---|---|---|
| 3,095,534 | 6/1963 | Cockrell | 318—345 |
| 3,177,417 | 4/1965 | Wright | 318—345 |
| 3,239,742 | 3/1966 | Mierendorf | 318—331 |

ORIS L. RADER, *Primary Examiner.*

E. SUTTON, *Assistant Examiner.*

U.S. Cl. X.R.

318—345

UNITED STATES PATENT OFFICE
CERTIFICATE OF CORRECTION

Patent No. 3,447,055                                   May 27, 1969

Raymond J. Mason

It is certified that error appears in the above identified patent and that said Letters Patent are hereby corrected as shown below:

Column 7, line 4, "capacitor" should read -- capacitors --; line 39, "first" should read -- second --. Column 8, line 17, cancel "and".

Signed and sealed this 23rd day of June 1970.

(SEAL)
Attest:

Edward M. Fletcher, Jr.                           WILLIAM E. SCHUYLER, JR.
Attesting Officer                                       Commissioner of Patents